UNITED STATES PATENT OFFICE.

BENJAMIN EDWIN FOSTER, OF STOCKWELL, COUNTY OF SURREY, ENGLAND.

PROCESS OF DECORATING OR ORNAMENTING GLASS.

SPECIFICATION forming part of Letters Patent No. 333,457, dated December 29, 1885.

Application filed July 31, 1885. Serial No. 173,160. (No specimens.)

*To all whom it may concern:*

Be it known that I, BENJAMIN EDWIN FOSTER, a subject of the Queen of Great Britain, residing at Stockwell, in the county of Surrey, England, have invented a new and useful Process for Decorating or Ornamenting Glass and other Surfaces, of which the following is a specification.

This invention consists in a method of producing a crystalline or crystallized face or surface on transparent, partly transparent, or opaque bodies or materials—such as glass, metal, leather, wood, paper, sheets of gelatine, or other translucent materials, canvas or other fabric, and many other natural and artificial materials and objects—the surface of which, in many cases, has previously been prepared by being coated with a varnish or otherwise.

In the aforesaid method I employ certain crystallizing agents, which will be hereinafter fully specified, and which consist of certain mechanically acting or active materials having a crystallizing effect, generally in combination with certain other mechanically reacting or restraining and fixing and binding materials. I say mechanical in contradistinction simply to a mere chemical action, and I prefer to call crystallization a "mechanical action."

The aforesaid varnish or other coating may consist of any good quality of oil varnish—such as copal varnish or any description of varnish of pale color and good body; or it may consist of gelatine or gelatinous compound—such as parchment-size; or in certain cases, hereinafter specified, it may consist of gum arabic or tragacanth. In the case of wood, canvas, and the like I first paint and then varnish the surface.

In practically applying the method to any surface or object or article—such, for instance, as a sheet of glass—I may apply the method either to a plain sheet or to one previously ornamented by any other known means, such as painting, gilding, silvering, frosting, etching, and the like. It will be found that when the varnish or other coating has been covered with the aforesaid crystallizing solution, and the latter has been allowed to dry and is then washed off, that the crystallizing effect has actually penetrated or been reproduced on or impressed into the varnish or other coating, which latter therefore has assumed a crystalline aspect or face; and it is therefore possible to use my invention in both ways—that is to say, with the covering or coating of the crystallizing solution retained or removed. In the former case I protect the crystallizing agent by a coating of varnish of any suitable kind. To these crystalline surfaces I may again apply decoration—such as painting in transparent or other colors or gilding or silvering—according to any desired design or lettering; or, in case of glass, I may silver or gild the entire crystallized surface.

In order to illustrate it by examples, I take, for example, a sheet of transparent glass of any color, tint, size, quality, or thickness, and either plain or ornamented by painting in transparent or other colors, or by drawing, painting, etching, gilding, or silvering, some or all combined, and in any desired design or style whatever. On the same surface of the glass—that is to say, usually the back—and whether first coated with a good quality of pale oil varnish—such as copal—or of gelatine or gelatinous substance or not, I, according to my invention, apply the crystalline or crystallizing and more or less transparent coating in an even layer sparingly or liberally, for reasons hereinafter stated. This layer or coating consists of a solution composed of the sulphates of zinc, alumina, soda, magnesia, and other sulphates, nitrates, acetates, or any other suitable soluble and crystallizable salt singly or in combination. The force of crystallization I prefer to control by mixing in with the solution some suitable binding or fixing substance—such as solution or mucilage of dextrine, gum-arabic, tragacanth, starch, gelatine, albumen, or equivalent substance having binding or fixing properties, and especially exerting the required force of contraction while parting with the water of solution and rendering the crystalline coating tangible and permanent. The effect produced by the crystallizing action is very beautiful. If the varnish or gelatinous grounding is applied in the first instance to the glass surface before the crystallizing agent is put on, I allow this grounding to become thoroughly dry (which usually takes from twelve to twenty-four hours) before I apply the coating with the crystallizing solution; or I may, while the grounding is sufficiently "tacky" or adhesive, apply gold or silver leaf thereto, and then put on the crystallizing agent. I may, also, before applying the latter describe lines or produce any ornament of a diaper or other pattern by the aid, for instance, of stencil-plates on the silvered or gilt surface, with a mixture in about equal parts of dry white lead and ultramarine-blue in powder ground in turpentine to a fine paste, to which I add sufficient cabinet-varnish or other varnish soluble in turpentine to render the mixture fit for use in a sable pencil or brush or stencil-brush. When this application is quite dry, I apply the crystallizing solution. The lines of the varnish and lead mixture now exert on the crystallizing solution the force of repulsion, while the parts covered by the lead mixture are not acted upon, and the appearance produced is that of brocaded silk.

As already stated, if the coating of crystallizing solution has been allowed to become thoroughly dry, so that the crystallizing action has thoroughly penetrated into the varnish or gelatinous grounding underneath it, which usually takes about forty-eight hours, then I may wash off the crystallizing agent, and the varnish or gelatinous grounding will then be found to present a crystalline appearance almost as if the crystallizing agent were still on; but if I leave the crystallizing agent on, (and whether there be a varnish or gelatinous grounding underneath or not,) then I protect it against atmospheric influences by giving it a coating of clear colorless hard-drying varnish—such, for example, as mastic; but cheaper kinds will answer.

The sheet of glass having a crystalline appearance on one side, but without the aforesaid alternative silvering or gilding applied below the crystallizing coating, is now at once applicable as a transparency for the decoration of, say, window-panes, advertising-tablets, and the like; or I may back up the crystalline surface with ordinary looking-glass silvering or with gold or silver leaf, or with any other bright and lustrous surface coating, metallic or otherwise; or I may provide a backing consisting of a sheet of glass or metal or other body having light-reflecting properties. The appearance thus produced is that of a crystalline metallic surface, under certain conditions possessing the luster of silk, satin, plush, and the like, without color other than that due to the tint of the glass, or that of the backing-up surface or reflective backing. I may, however, at this stage effect any desired coloring by painting either directly upon the crystalline surface itself with transparent or opaque colors in oil or otherwise or upon the bright reflecting backing, or I may use a combination of both methods, and if an ornamental background—as, for example, a diaper pattern—be desired in addition to color, I either paint it on the reflecting back by hand or otherwise. I complete the operation in this case by placing the sheet of glass having on its back surface the crystalline appearance in front of the reflecting backing, securing them together in a frame, or by cementing or otherwise uniting at their edges.

Instead of, as aforesaid, applying the gold or silver leaf to the varnish-coating having the crystalline impression, (from the washed-off crystallizing solution,) I may produce a similar effect by first applying the crystallizing solution to the glass direct, (without intervention of varnish,) but in a very diluted form, and by preference the solution No. 10, hereinafter specified, and while this layer of solution is still wet and fluid I lay upon it the gold or silver leaf, or both, in the usual manner of water gilding or silvering. In the subsequent process of drying the gold or silver leaf will conform to the crystallizing action and adhere to the surface of the crystallized coating; but it will also to a certain extent advantageously alter the character of the crystallization. When the crystallization is finished and the gilded or silvered surface is quite dry, I protect the latter against oxidation by applying a suitable water-proof coating—such, for instance, as a hard-drying paint composition made of white lead, red lead, gold size, and turpentine.

In producing a crystalline face on other substances—such as wood—I first apply a good coating of paint, size, or lacquer varnish, or the like suitable for receiving a coat of copal or other varnish. This latter varnish forms the ground, on which I then apply my crystallizing solution, either direct or after previous gilding or silvering, as already described. As applied to paper, I first put on a good coating of size or gelatine and then varnish, and then apply my crystallizing solution either direct or after previous gilding or silvering. For thin translucent sheets of insoluble gelatine, or for leather, cloth, and the like, I first apply the varnish, and then proceed as above.

I will now describe various solutions of the soluble and crystallizable salts or agents and solutions of the various controlling, binding, and fixing substances or agents, and the combinations of the same which I have found suitable in about the proportions given by weight; but I desire it to be distinctly understood that I may and under some circumstances do prefer to employ other crystallizing agents as well as other controlling substances having the same or similar properties.

*Crystallizing Agents.*

No. 1: two parts of sulphate of soda dissolved in three parts of boiling water.

No. 2: three parts of sulphate of zinc dissolved in five parts of boiling water.

No. 3: three parts of the powdered sulphate of alumina in four parts of boiling water.

No. 4: four parts of sulphate of magnesia dissolved in three parts of boiling water.

No. 5: one part of nitrate of potash dissolved in two parts of boiling water.

No. 6: one part of chloride of sodium dissolved in two parts of clean cold water.

No. 7: two parts of chloride of tin dissolved in three parts of boiling distilled water.

No. 8: two parts of acetate of soda dissolved in three parts of clean boiling water.

No. 9: one part of bichromate of potash dissolved in twenty parts of distilled water by the aid of heat.

*Controlling, Binding, and Fixing Agent.*

No. 1. I prepare solution of dextrine by steeping four parts of dextrine in ten parts of clean cold river-water during twelve hours, then heat in a water bath for twenty minutes at boiling-point, and strain by passing through fine muslin.

No. 2. Another solution consists of gum-arabic, two parts gum-arabic being steeped in three parts clean cold river-water, stirring occasionally during twenty-four hours, then strain through muslin.

No. 3. I prepare solution of mucilage of gum-tragacanth by steeping one part of gum-tragacanth in forty parts of clean cold river-water during forty-eight hours, then heat in a water bath for twenty minutes, stirring during the operation, then set the solution aside for at least four days.

No. 4. I prepare solution of gelatine by steeping one part of clean parchment-cuttings in twenty parts of clean cold river-water during twenty-four hours, then heat in a water bath during half an hour, strain through fine muslin, and set aside to cool.

No. 5. I prepare solution of albumen by mixing gently four parts albumen, preferably in the form of the whites of eggs, with one part of cold distilled water, allow it to remain during twelve hours, and then strain through fine muslin.

*Combinations of the Various Crystallizing Agents and the Various Controlling, Binding, and Fixing Agents.*

No. 1. I take three parts of solution of crystallizing agent No. 1 and five parts of solution of controlling agent No. 1, thoroughly mix, and strain through fine muslin.

No. 2. I take equal parts of solution of crystallizing agent No. 1 and solution of controlling agent No. 2, thoroughly mix, and strain.

No. 3. I take three parts of solution of crystallizing agent No. 1, five parts solution of controlling agent No. 2, thoroughly mix, and strain.

No. 4. I take five parts of solution of No. 2 crystallizing agent, three parts of solution of controlling agent No. 2, thoroughly mix, and strain.

No. 5. I take twenty-five parts of solution of No. 4 crystallizing agent, two parts of solution of No. 6 crystallizing agent, thirty parts of solution of controlling agent No. 1, thoroughly mix, and strain.

No. 6. I take thirty parts of solution of No. 4 crystallizing agent, one part of solution of No. 7 crystallizing agent, twenty-five parts of solution of No. 2 controlling agent, thoroughly mix, and strain.

No. 7. I take five parts of solution of No. 4 crystallizing agent, one part of solution of No. 2 controlling agent, thoroughly mix, and strain.

No. 8. I take three parts of solution of No. 4 crystallizing agent, four parts of solution of No. 3 controlling agent, thoroughly mix by beating up with a spatula or the like, and then strain.

No. 9. I take twenty parts of solution of No. 4 crystallizing agent, two parts of solution of No. 8 crystallizing agent, fifteen parts of solution of No. 2 controlling agent, thoroughly mix, and strain.

No. 10. I take three parts of solution of No. 5 crystallizing agent, two parts of solution of No. 2 controlling agent, thoroughly mix, and strain.

No. 11. I take equal parts of solution of No. 5 crystallizing agent and No. 3 controlling agent, thoroughly mix by beating with a spatula, and strain.

No. 12. I take five parts of solution of No. 4 crystallizing agent, four parts of solution of No. 4 controlling agent, mix, and strain.

No. 13. I take equal parts of the solutions of either Nos. 1, 2, 3, or 4 crystallizing agents and of solution of controlling agent No. 5, mix gently, and strain.

No. 14. I add to any of the above combinations ten parts of solution No. 9 to one hundred parts of the crystallizing agents to render such combination less soluble when that is desirable.

I apply these solutions or combinations of solutions sparingly to produce small effects; liberally to produce large effects of crystallization.

*Attenuated Solutions or Combinations of Solutions.*

I take any of the above-described combinations (with the exception of No. 5, which is calculated to produce small effects only) and dilute the same by the addition of from two to twelve times the quantity of clean cold river-water. I apply these attenuated combinations in as full or thick a coating as possible, but so as to avoid flowing off at the edges of the glass or other surface. By these means I obtain crystallization of a very extended character in proportion to the degree of attenuation and the quantity applied to the surface. Most of the above-mentioned combinations of the solutions of crystallizing and controlling agents are of a liquid character; therefore can only be applied to the surface while in a horizontal position. I can, however, and do under some circumstances prefer to carry out my process upon surfaces in a slanting or perpendicular position. This I effect by employing such of the combinations of solutions of crystallizing and solutions of controlling agents as are of a pasty or thick or viscid consistency.

The above-described substances or ingredients, their solutions, and the proportions of their combinations are not absolute, as I can and do under some conditions prefer to employ other substances as equivalents for or in addition to those hereinbefore enumerated, both in respect of the crystallizing agents and the controlling agents.

Although I have heretofore described the application of crystallizable agents in combination with controlling agents, I wish it to be understood that I may use the former without the latter; but such combined use is much to be preferred.

Having thus particularly described and ascertained the nature of my said invention and in what manner the same is to be performed, I declare that I am aware that glass or vitreous materials have heretofore been treated with chemical agents by the aid of heat so as to produce a crystalline effect on the glass itself; but it will be observed that by my invention the glass itself is left intact; but

What I claim is—

1. The method of producing a crystalline or crystallized surface coating on glass, metal, or other material, consisting of applying to said surface a solution of crystallizable salts, and then a reacting and fixing agent, substantially as set forth.

2. The method of producing a crystalline or crystallized surface coating on glass, metal, or other material, consisting of applying to said surface a solution of crystallizable salts, and then a reacting and fixing agent, and then a finishing coat of varnish to resist and protect the crystalline surface from atmospheric influences, substantially as set forth.

BENJAMIN EDWIN FOSTER.

Witnesses:
 GEO. J. B. FRANKLIN,
 THOMAS LAKE.
*Both of* 17 *Gracechurch Street, London, E. C.*